United States Patent
Zick et al.

(10) Patent No.: US 6,236,177 B1
(45) Date of Patent: May 22, 2001

(54) BRAKING AND CONTROL CIRCUIT FOR ELECTRIC POWER TOOLS

(75) Inventors: Jonathan A. Zick, Waukesha; Joseph W. Willhide, Brookfield, both of WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 09/326,028

(22) Filed: Jun. 4, 1999

Related U.S. Application Data
(60) Provisional application No. 60/088,176, filed on Jun. 5, 1998.

(51) Int. Cl.[7] .................................................. H02P 3/00
(52) U.S. Cl. .......................... 318/362; 318/375; 318/376; 318/757
(58) Field of Search .................................. 318/362–374, 318/375–381, 493, 757, 17; 408/9

(56) References Cited

U.S. PATENT DOCUMENTS

| | | | |
|---|---|---|---|
| 4,095,153 | 6/1978 | Matty et al. | 318/376 |
| 4,216,417 | 8/1980 | Anderson et al. | 318/274 |
| 4,319,170 | 3/1982 | Brent | 318/376 |
| 4,460,857 | 7/1984 | Michaelis | 318/375 |
| 4,529,919 | 7/1985 | Melocik et al. | 318/373 |
| 4,816,726 | 3/1989 | Novis et al. | 318/293 |
| 4,843,297 | 6/1989 | Landino et al. | 318/811 |
| 4,862,052 | * 8/1989 | Unsworth et al. | 318/757 |
| 4,911,566 | 3/1990 | Imaseki et al. | 400/120 |
| 4,929,875 | 5/1990 | Olsson | 318/362 |
| 4,990,844 | 2/1991 | Gritter et al. | 318/762 |
| 5,014,336 | 5/1991 | Grassl et al. | 388/843 |
| 5,130,624 | 7/1992 | Bashark | 318/280 |
| 5,149,998 | 9/1992 | Wolcott | 310/105 |
| 5,170,105 | 12/1992 | Kumar | 318/362 |
| 5,291,106 | 3/1994 | Murty et al. | 318/375 |
| 5,357,179 | * 10/1994 | Abbagnaro et al. | 318/17 |
| 5,361,022 | 11/1994 | Brown | 318/375 |
| 5,386,185 | 1/1995 | Beck et al. | 318/762 |
| 5,424,622 | 6/1995 | Keller et al. | 318/375 |
| 5,449,990 | 9/1995 | Bowling et al. | 318/607 |
| 5,523,701 | * 6/1996 | Smith et al. | 324/772 |
| 5,530,328 | 6/1996 | Fernandez et al. | 318/370 |
| 5,537,014 | 7/1996 | Kettle, Jr. et al. | 318/375 |
| 5,619,109 | 4/1997 | Cameron et al. | 318/375 |
| 5,642,023 | * 6/1997 | Journey | 318/493 |
| 5,659,204 | 8/1997 | Miller et al. | 290/9 |
| 5,789,885 | * 8/1998 | Seel | 318/375 |
| 5,902,077 | * 5/1999 | Halder | 408/9 |

FOREIGN PATENT DOCUMENTS

1675846-A1  9/1991  (SU) .

* cited by examiner

*Primary Examiner*—David Martin
*Assistant Examiner*—Rita Leykin
(74) *Attorney, Agent, or Firm*—Michael Best & Friedrich LLP

(57) ABSTRACT

A power tool including a braking and control circuit. The braking and control circuit includes a microcontroller-based control means circuit. The microcontroller assures control of switch means, such as triacs, switches and relays, and ensures that braking is effectuated regardless of the phase in the power cycle of the alternating current. Also, the microcontroller is programmable so that the braking and control circuit accommodates different braking conditions for different power tools and accommodates combinations of braking conditions for the same power tool. Further, the microcontroller is programmable to configure the braking and control circuit so that the braking force applied to the motor and the stopping time of the motor are regulated and adjustable. This may be accomplished by outputting a control signal so that the switch means skips cycles in the alternating current or by otherwise adjusting the operation of the switch means.

21 Claims, 8 Drawing Sheets

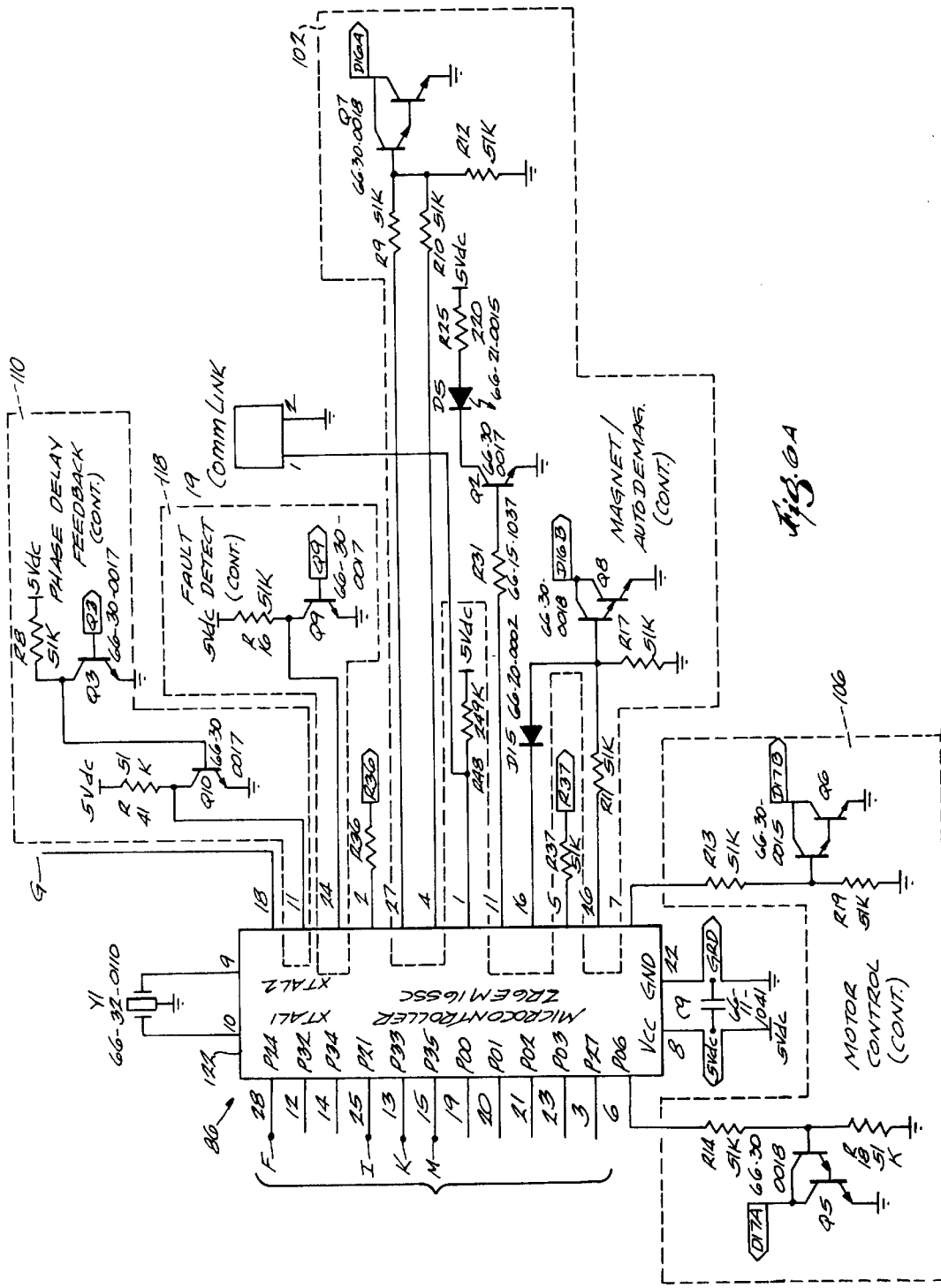

BRAKING AND CONTROL CIRCUIT FOR ELECTRIC POWER TOOLS

RELATED APPLICATIONS

This application claims the benefit of prior filed provisional patent application, serial No. 60/088,176, filed on Jun. 5, 1998.

BACKGROUND OF THE INVENTION

The invention relates to motors for electric power tools. More particularly, the invention relates to a braking and control circuit for such a motor.

AC universal motors have commonly been used in electric power tools, such as drills, circular saws and other types of equipment. Generally, such motors provide a high-power, light-weight power source for these power tools. Typically, the universal motor includes a housing, a stator assembly having a run coil, and a rotatable shaft or arbor having an armature mounted thereon. Current flows through the run coil and creates a magnetic field which interacts with the magnetic field of the armature. This interaction rotatably drives the arbor. To drive a tool element, such as a drill bit or a saw blade, the tool element may be mounted directly on the arbor or be coupled to the arbor by a gear transmission or the like.

Conventional universal motors tend to coast, i.e., the arbor continues to rotate for some time after the motor is disconnected from the electrical power source. This coasting generally results from the rotational momentum of the arbor, the transmission, and the tool attachments. To prevent or limit coasting, the motor often includes a braking arrangement.

A typical braking arrangement includes a dynamic braking circuit which relies on passive generation of free wheeling current in the stator to produce a counter-electromagnetic force (counter-EMF) to stop the rotation of the arbor and to, thereby, brake the motor. One such dynamic braking circuit is shown and described in U.S. Pat. No. 5,294,874.

SUMMARY OF THE INVENTION

One problem with existing braking arrangements, such as the above-described dynamic braking circuit is that, if the motor is disconnected from the power source and reconnected in a closed loop at a point or phase in the power cycle of the alternating current at which there is little or no voltage, the braking circuit will not generate the necessary counter-EMF to brake the arbor.

Another problem with existing braking arrangements is that the conditions in which braking required are different for different power tools. Therefore, for different power tools, the braking arrangement must be configured to accommodate the different braking conditions. For example, in some power tools, such as portable drill presses, braking is required when the drill press accidentally disconnects from the workpiece ("breakaway") during drilling operations, a safety-related braking condition. In other power tools, such as circular saws, braking is required when the tool element, such as the saw blade, binds on the workpiece and the power tool is jerked or kicks back, another safety-related braking condition. Further, in some power tools, braking may be desired each time the operator releases the trigger so that the blade stops quickly and the operator can move to the next drilling or cutting operation, a productivity-related braking condition.

Yet another problem with existing braking arrangements is that, if the motor is braked too quickly, the arcing occurs between the rotor and the commutator brushes, thereby reducing the life of the motor and the brushes. This arcing can be especially problematic if the motor is braked frequently, i.e., productivity-related braking. However, if the motor is not braked quickly enough, the braking can be ineffective, i.e., in a safety-related braking condition.

The present invention provides a power tool including a braking and control circuit that alleviates the problems with existing braking arrangements. The present invention provides a braking and control circuit including a microcontroller-based control circuit. The microcontroller assures control of switch means, such as triacs, switches and relays, and ensures that braking is effectuated regardless of the phase in the power cycle of the alternating current. Also, the microcontroller is programmable so that the braking and control circuit accommodates different braking conditions for different power tools and accommodates combinations of braking conditions for the same power tool. Further, the microcontroller is programmable to configure the braking and control circuit so that the braking force applied to the motor and the stopping time of the motor are regulated and adjustable. This may be accomplished by outputting a control signal so that the switch means skips cycles in the alternating current or by otherwise adjusting the operation of the switch means.

The present invention provides a braking and control circuit for an electric motor, the motor including a housing, a stator supported by the housing, and a shaft rotatably supported by the housing, wherein the stator is selectively connected with a power source to rotatably drive the shaft. The braking and control circuit comprises first switch means for selectively disconnecting the motor from the power source, second switch means electrically connected across the motor; and control means electrically connected with at least one of the first switch and the second switch means and operable to output a control signal to control the at least one of the first switch means and the second switch means to brake the motor.

The control means is preferably electrically connected with the first switch means and with the second switch means. Preferably, the control means outputs a first control signal to the first switch means so that the first switch means disconnects the motor from the power source. At approximately the same time or shortly thereafter, the control means also preferably outputs a second control signal to the second switch means so that the second switch means connects the motor in a closed loop and generates a counter-electromagnetic force to brake the motor. Also, the control means preferably selectively outputs the first control signal to the first switch means so that the first switch means selectively disconnects and reconnects the motor and the power source and selectively outputs the second control signal to the second switch means so that the second switch means selectively connects and disconnects the motor in a closed loop to regulate a braking force applied to brake the motor.

The control means preferably includes a microcontroller operable to output the control signal and programmable to optimize braking of the motor. Preferably, the microcontroller is programmable to change the stopping time of the motor and to change the braking force applied to the motor. Also, the microcontroller is preferably programmable to output the control signal on selected ones of the plurality of cycles of the alternating current to control the first switch means and the second switch means on the selected ones of the plurality of cycles to brake the motor and to output the control signal at a point in the alternating current so that a desired voltage is supplied to brake the motor.

The present invention also provides a power tool comprising a housing, an electric motor, and braking and control means for controlling and braking the motor. The braking and control means includes switch means electrically connected with the motor and control means electrically connected with the switch means and operable to output a control signal to control the switch means to brake the motor.

Preferably, the control means includes a microcontroller operable to output the control signal. The switch means are preferably operable to selectively disconnect the motor from the power source, and the braking and control means preferably further includes second switch means electrically connected with the motor and operable to selectively connect the motor in a closed loop. The microcontroller preferably outputs a first control signal to the first switch means so that the first switch means disconnects the motor from the power source and outputs a second control signal to the second switch means so that the second switch means connects the motor in a closed loop and generates a counter-electromagnetic force to brake the motor.

Preferably, the microcontroller is programmable to configure the braking and control means for a selected power tool and for a selected braking condition. The power tool further preferably comprises trigger means electrically connected with the control means and operable to trigger braking of the motor when a braking condition for the power tool exists. The trigger means outputs a trigger signal to the control means so that the microcontroller outputs the control signal to the switch means to brake the motor. The trigger means may include the on/off switch or may include sensing means for sensing a safety-related braking condition, such as "breakaway" of a drill press from a workpiece or "binding" of a tool element, i.e., a saw blade, on the workpiece.

One advantage of the present invention is that the braking and control circuit operates to provide the necessary braking force regardless of the phase of the alternating current being supplied to the motor.

Another advantage of the present invention is that the braking and control circuit is programmable to accommodate different braking conditions for different power tools and accommodates combinations of braking conditions in the same power tool.

Yet another advantage of the present invention is that the braking force applied to the arbor may be controlled and adjusted so that the arbor may be stopped more or less quickly.

Other features and advantages of the invention will become apparent to those skilled in the art upon review of the following detailed description, claims and drawings.

BRIEF DESCRIPTION OF THE DRAWINGS

FIGS. 6A and 6B are detailed schematic diagrams of the portions of the motor and the braking and control circuit illustrated in FIG. 4B.

Figure 1:
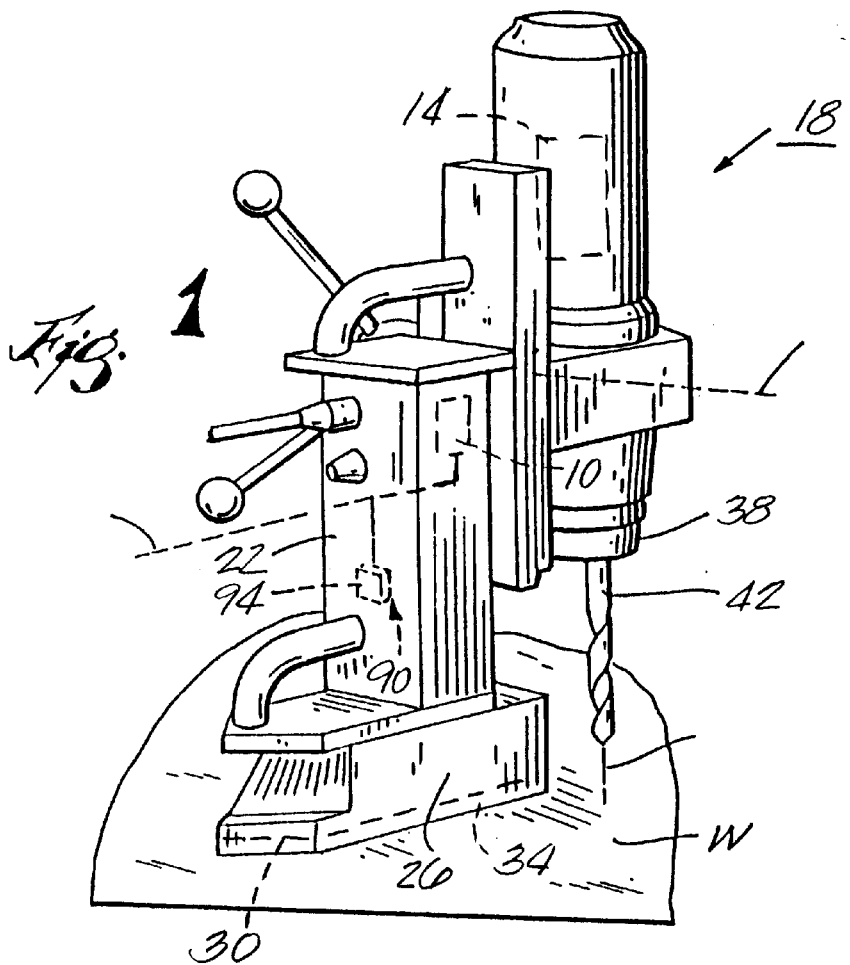
FIG. 1 is a perspective view of a power tool and a braking and control circuit embodying the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

Figure 2:
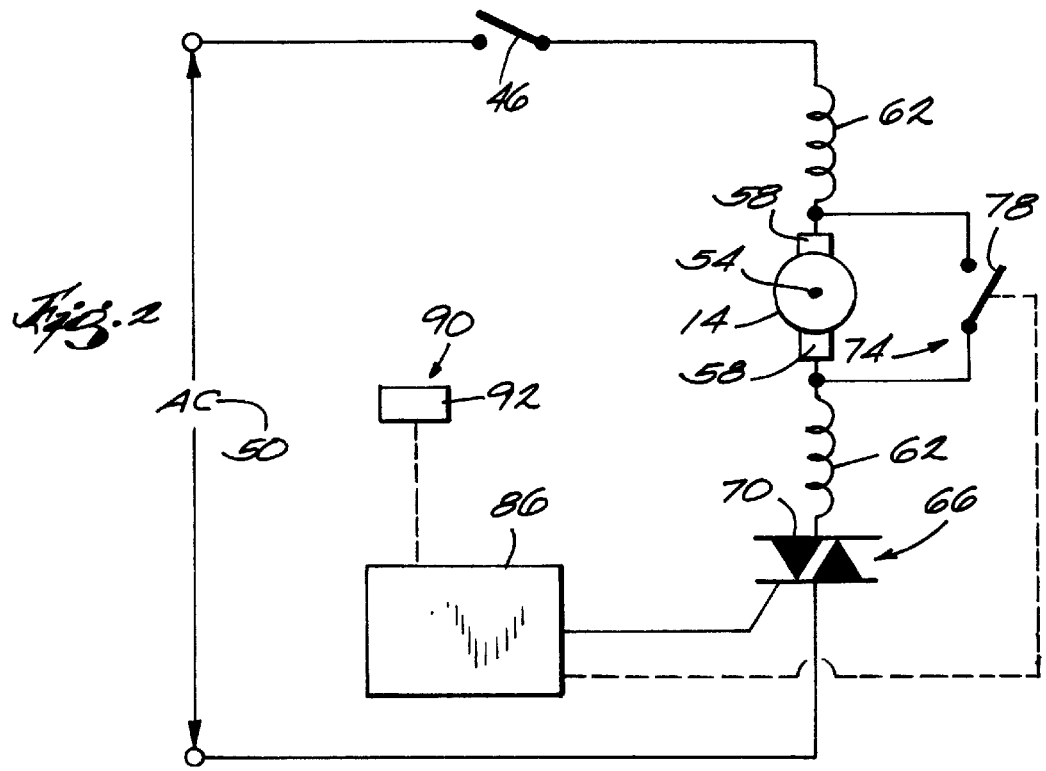
FIG. 2 is a schematic illustration of an electric motor and the braking and control circuit.
Figure 3:
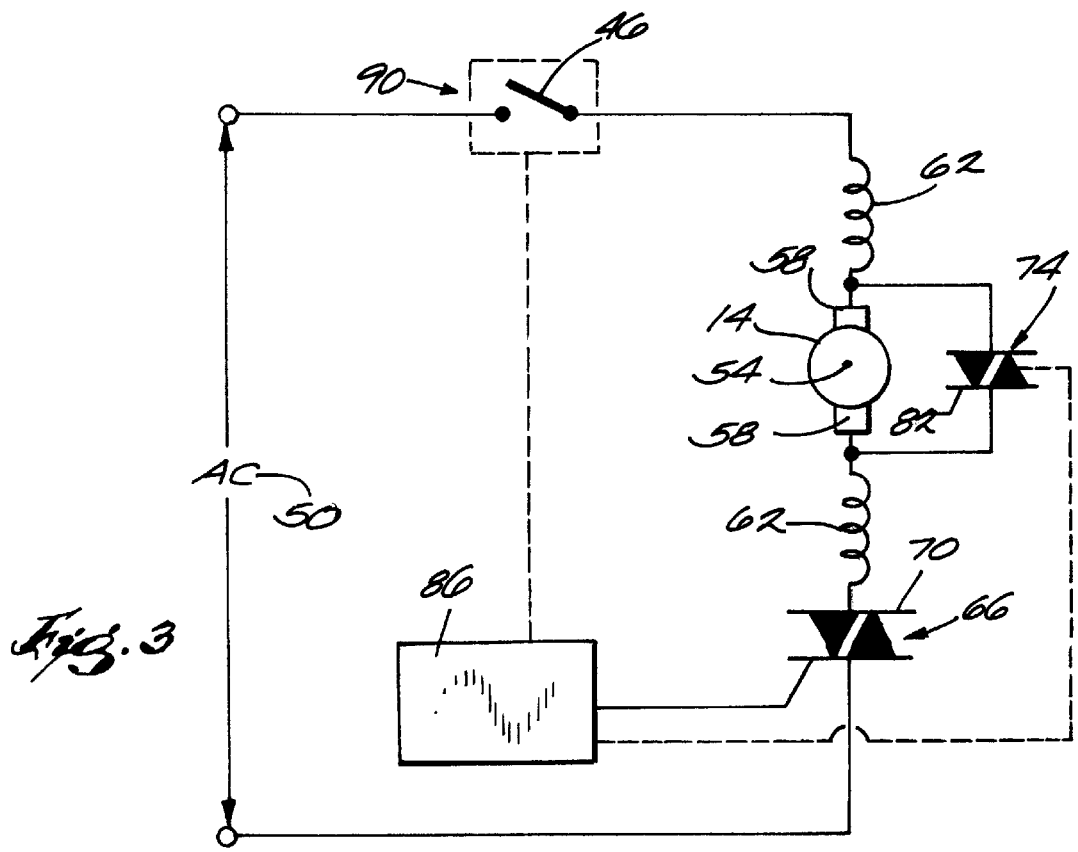
FIG. 3 is a schematic illustration of an alternative embodiment of the motor and the braking and control circuit.

FIGS. 1–3 illustrate a power tool including a braking and control circuit 10 (schematically illustrated in FIGS. 2–3) embodying the invention and for braking and controlling an electric motor 14 (schematically illustrated in FIGS. 2–3). In the illustrated construction, the power tool (see FIG. 1) is a portable drill press 18 including a housing 22 supported by a base 26. The base 26 includes a force applying element 30 (partially shown) for connecting the base 26 to the surface of a workpiece W. In the illustrated construction, the force applying element 30 is an electromagnet assembly 34 (partially shown) for attaching the drill press 18 to a ferromagnetic workpiece W. In other constructions (not shown), the force applying element 30 may be a permanent magnet, a vacuum pad, or a clamp mechanism.

The electric motor 14 is supported by the housing 22 and is operable to rotatably drive a spindle assembly 38. The spindle assembly 38 is connected to a tool element, such as a drill bit 42, to drill through or cut the workpiece W. An on/off switch 46 is operated by a trigger or button 48 and selectively connects the electric motor 14 to a power source 50.

The motor 14 is generally conventional and, as shown in FIGS. 2–3, includes a rotating arbor or shaft 54 on which an armature (not shown) is mounted. The armature includes armature windings (not shown) for generating an armature field. Electricity is conducted to the rotating armature by a pair of commutator brushes 58. The motor 14 also includes a stator assembly (partially shown) including run winding means 62 for generating a magnetic field for rotating the armature and the arbor 54.

The braking and control circuit 10 includes (see FIGS. 2–3) first switch means 66 connected in series with the motor 14 and operable to selectively disconnect the motor 14 from the power source 50 to brake the motor 14. In the illustrated construction, the first switch means 66 includes a triac 70 which is turned off to disconnect the motor 14 from the power source 50. However, in other constructions (not shown), the first switch means 66 may be any type of switch means which is operable to disconnect the motor 14 from the power source 50.

The braking and control circuit 10 also includes (see FIGS. 2–3) second switch means 74 connected in parallel with the motor 14 across the armature. The second switch means is operable to connect the motor 14 in a closed loop and to generate counter-electromagnetic force (counter-EMF) to brake the motor 14. In the construction illustrated in FIG. 2, the second switch means 74 includes a mechanical switch 78 which is normally open and which is closed to connect the motor 14 in the closed loop. In the alternative construction illustrated in FIG. 3, the second switch means includes a solid state switch, such as a triac 82 or other solid state device (not shown). The triac 82 is normally turned off and is turned on to connect the motor in the closed loop.

In addition, the braking and control circuit 10 includes (see FIGS. 2–3) a control circuit or control means 86 electrically connected to at least one of the first switch means 66 and the second switch means 74 and operable to control at least one of the first switch means 66 on the second switch means 74 to brake the motor 14. In the preferred embodiment, the control means 86 is electrically connected to and controls both the first switch means 66 and the second switch means 74 to brake the motor 14. To brake and control the motor 14, the control means 86 selectively outputs a first control signal to control the first switch means 66, to disconnect the motor 14 from the power source 50, and selectively outputs a second control signal to control the second switch means 74, to connect the motor 14 in a closed loop and to generate counter-EMF.

The braking and control circuit 10 further includes (see FIGS. 2–3) trigger means 90 electrically connected to the control means 86 and operable to trigger braking of the motor 14. When a braking condition occurs, the trigger means 90 outputs a trigger signal to the control means 86 to trigger braking of the motor 14.

There are two general categories of braking conditions, i.e., conditions in which braking of the motor 14 is required or desired. The first category includes safety-related braking conditions. In this category, braking of the motor 14 is required if an unsafe operating condition for the power tool arises. For example, such a safety-related braking condition occurs if the force applying element 30 of the drill press 18 accidentally disconnects from the workpiece W during drilling operations ("breakaway"). Another safety-related braking condition occurs when the tool element, such as a drill bit or a saw blade, binds on the workpiece W causing the power tool to jerk or kick back. In either of these safety-related braking conditions, braking of the motor 14 is required to prevent injury to the operator or damage to the equipment or workpiece W. Further, in such safety-related braking conditions, braking of the motor 14 is accomplished as quickly as possible without damaging the components of the motor 14 (i.e., the motor 14 is braked in 1 sec.).

The other category of braking conditions includes productivity-related braking conditions. In this category, braking of the motor 14 is desired to stop the associated tool element so that the operator can move to the next drilling or cutting operation more quickly. The operator does not have to wait for the tool element to coast to a stop before continuing operations. Such productivity-related braking can be accomplished more slowly than the safety-related braking to reduce the wear on the motor (i.e., the motor 14 is braked in 2 sec.). This is important because productivity-related braking occurs more frequently than safety-related braking. Generally, a productivity-related braking condition results when the operator releases the trigger and on/off switch to disconnect the motor from the power source.

In the construction illustrated in FIG. 2, the trigger means 90 includes sensing means 92 for sensing a safety-related braking condition. Specifically, the drill press 18 includes a breakaway sensor 94 for sensing breakaway of the base 26 and the electromagnet assembly 34 from the workpiece W. Such a breakaway sensor 94 may be any type of sensing means such as a mechanical sensor, i.e., a depressible plunger (not shown), an electrical sensor, or a magnetic sensor, i.e., a Hall Effect sensor, capable of sensing relative movement of the drill press 18 and the workpiece W or "breakaway" of the base 26 from the workpiece W. In this construction, if the drill press 18 breaks away from the workpiece W, the breakaway sensor 94 outputs the trigger signal, a "breakaway" signal, to the control means 86 to trigger braking of the motor 14.

In the construction illustrated in FIG. 3, the trigger means 90 triggers braking for a productivity-related braking condition. In the illustrated construction, the trigger means 90 includes the on/off switch 46. When the operator releases the trigger 48, so that the on/off switch 46 disconnects the motor 14 from the power source 50, the trigger signal, an "off" signal, is output to the control means 86 to trigger braking of the motor 14.

It should be understood that, in other constructions, the trigger means 90 may trigger braking of the motor 14 for both a safety-related braking condition and a productivity-related braking condition and may, therefore, include combinations of components to trigger braking in both categories of braking conditions. Further, it should be understood that, in yet other constructions, the trigger means 90 may include different types of sensing means 92 for sensing different types of safety-related braking conditions.

As explained below in more detail, the control means 86 receives an electrical signal representing the alternating current provided to the motor 14 by the power source 50. The electrical signal may be a current or a voltage waveform, though, in the preferred embodiment, the electrical signal is a current signal. The current signal is used to determine the present state of the alternating current provided to the motor 14 by the power source 50. After the trigger means 90 has output the trigger signal to the control means 86, the control means 86 outputs the control signals at a selected brake starting point or phase angle of the alternating current provided by the power source 50. As a result, braking is initiated when there is the desired voltage to generate the necessary counter-EMF to brake the motor 14, and braking is not generally initiated at points in the power cycle when there is little or no voltage from the power source 50, e.g., at a "zero-crossing" point of the alternating current.

As explained below in more detail, the control means 86 includes components which are programmable to optimize the braking of the motor 14. The components of the control means 86 are programmable so that the control means 86 outputs the control signals on selected power cycles and at selected phase angles and voltages of the alternating current from the power source 50. In this manner, the control means 86 can vary the braking force applied to the motor 14. Further, in this manner, the control means 86 can vary the stopping time of the motor 14 during braking.

Figure 4B:
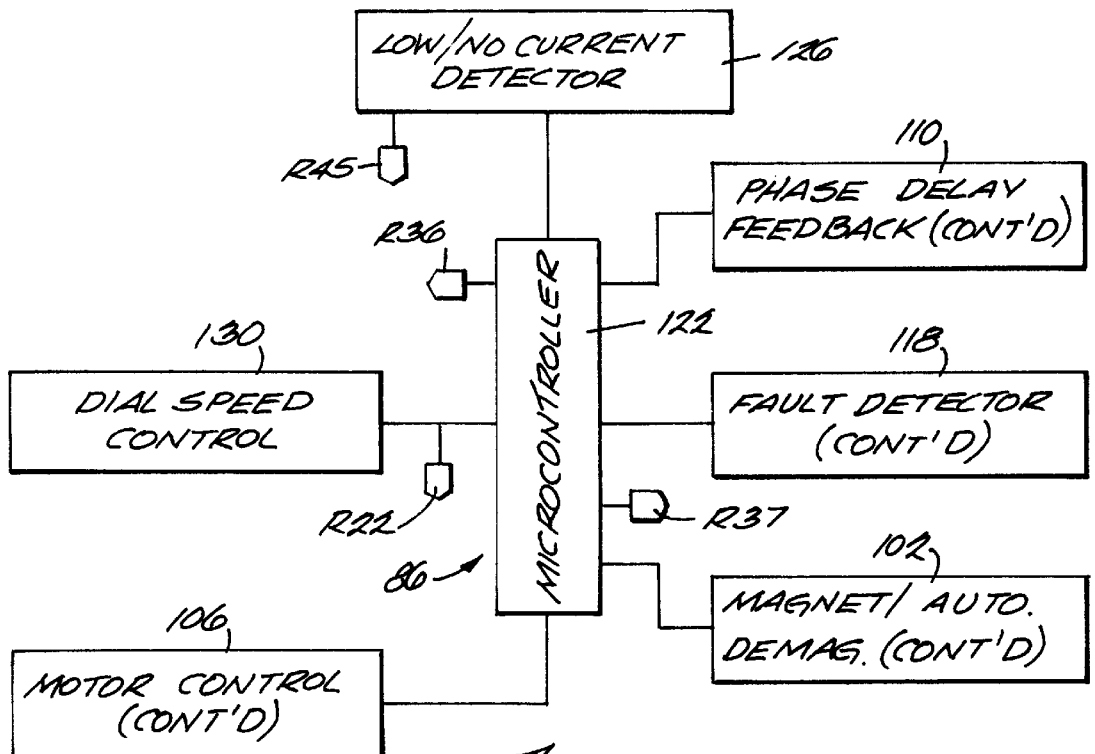
FIGS. 4A and 4B are schematic diagrams of portions of the motor and the braking and control circuit.
Figure 4A:
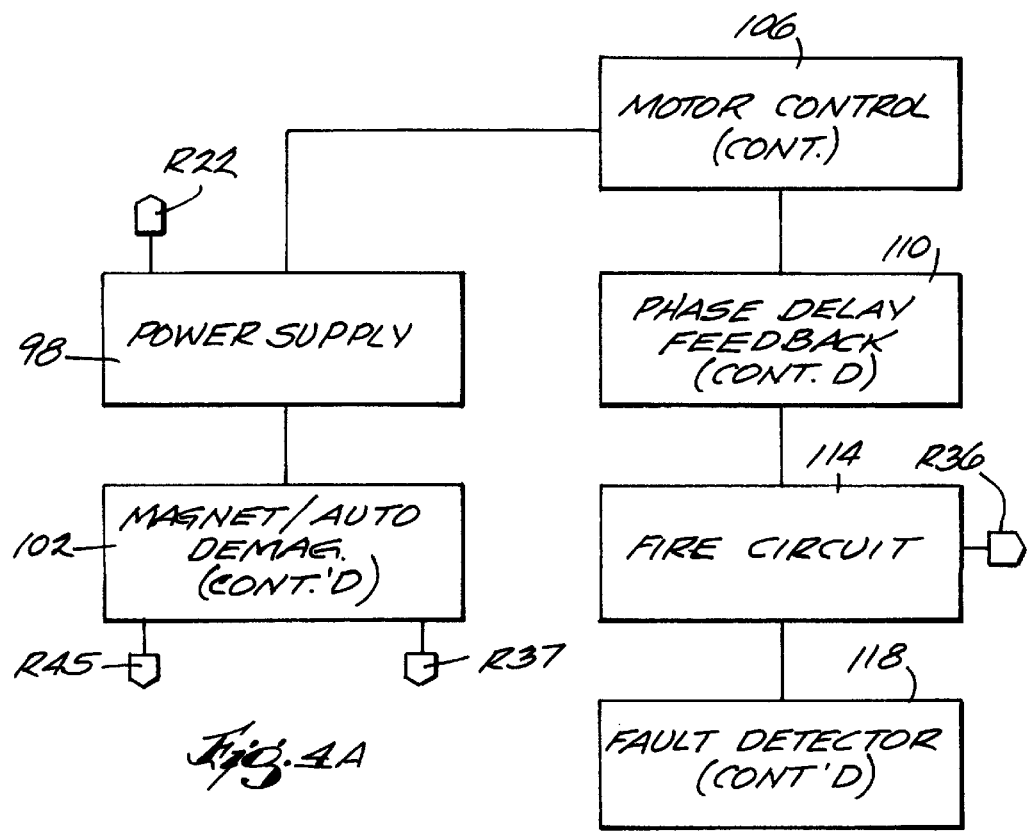
Figure 5A:
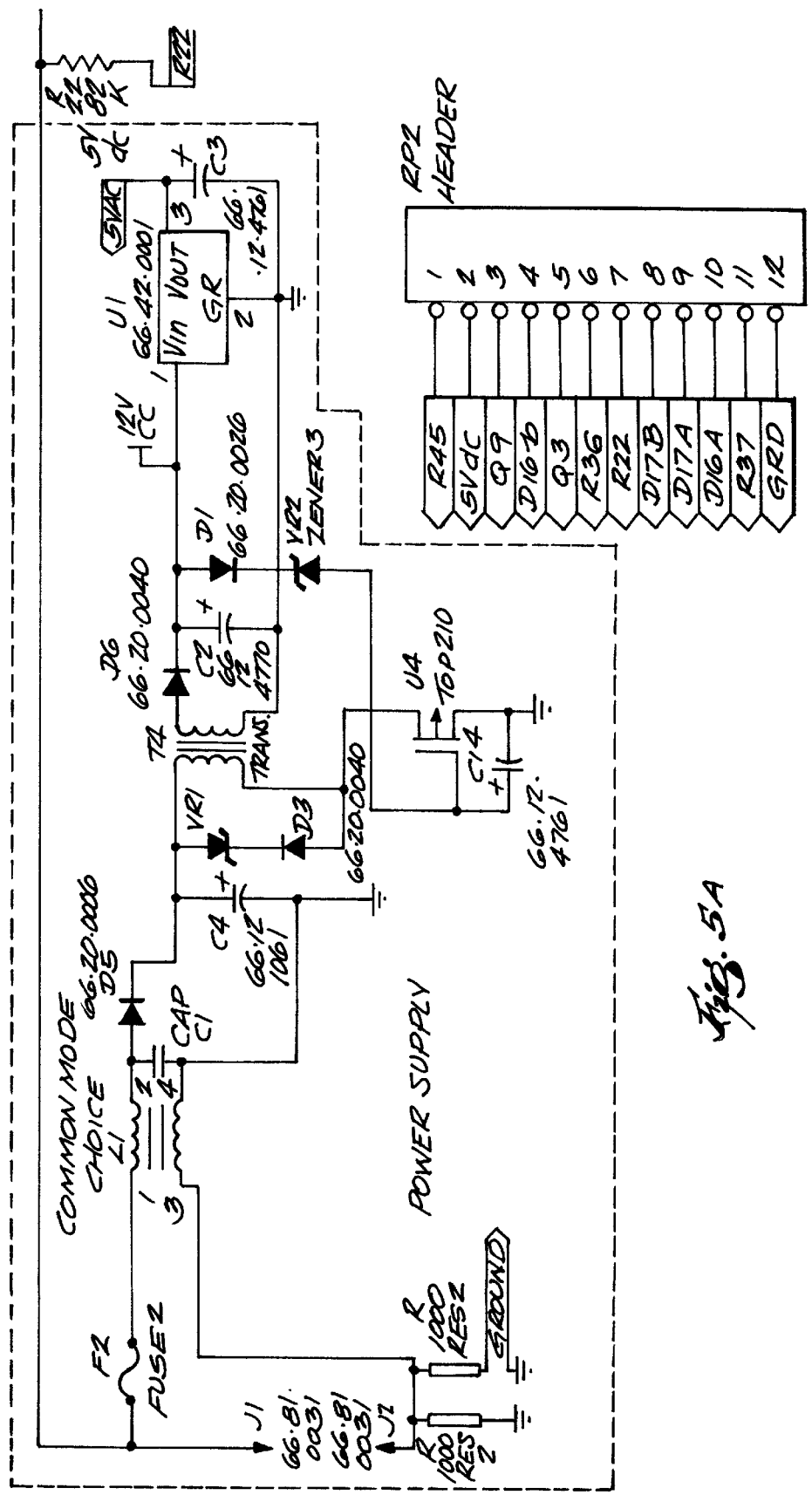
FIGS. 5A, 5B and 5C are detailed schematic diagrams of the portions of the motor and the braking and control circuit illustrated in FIG. 4A.

FIGS. 4A–B, 5A–C and 6A–B are schematic diagrams of portions of the motor 14 and the braking and control circuit 10 for use with the drill press 18. As shown in FIGS. 4A and 5A, the motor 14 includes a power supply 98 which is connected with the power source 50. In the construction illustrated in FIG. 5A, the power supply 98 is in a non-isolated fly-back configuration. The power supply 98 creates a 12 V DC and a 5 V DC output from a 90 V AC to a 255 V AC input. U4 is the controller for the power supply 98 and is a three-terminal, off-line PWM switch. Capacitor C4 charges to the peak of the AC mains voltage of the power source 50. Half-wave rectification by diode D5 converts the AC voltage to DC voltage but generates a ripple voltage on capacitor C4. Zener diode VR1 and diode D2 clamp voltage spikes and reduce drain voltage ringing when field-effect transistor ("FET") U4, a TopSwitch device turns off. Diode D6 and capacitor C2 rectify and filter the secondary of coupling transformer T1. The output voltage is directly sensed by Zener diode VR2. Diode D1 is a blocking diode that prevents loading of FET U4 control pan period. Capacitor C14 on the control pin of FET U4 determines the auto-restart frequency during startup and output short circuit conditions, filters internal MOSFET gate charge currents flowing into the control pin, and provides loop compensation. Regulator U1 is a basic fixed 5 V DC regulator with C3 filtering the output. C1 and L1 are all EMI filters.

Figure 5B:
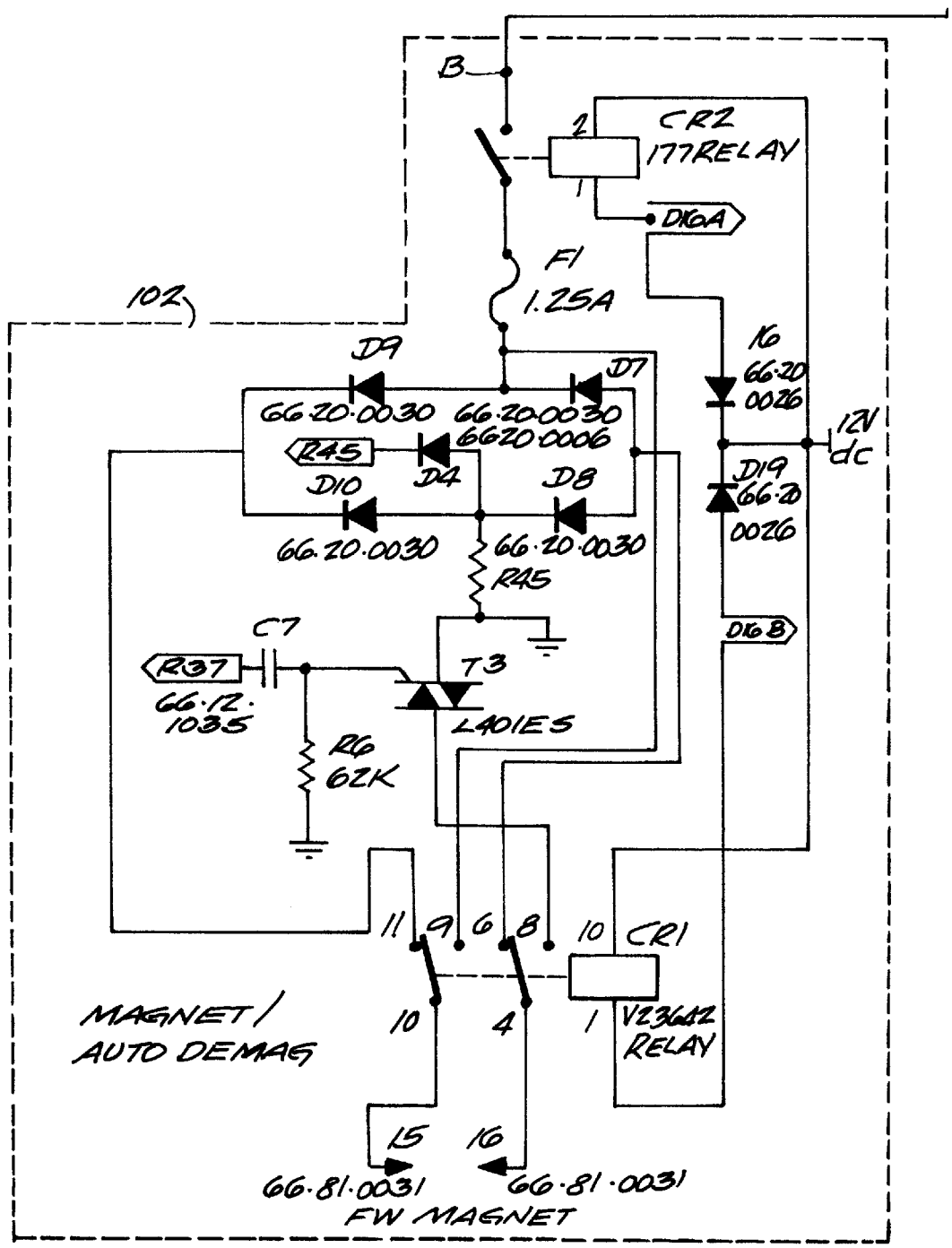

As shown in FIG. 4A, 5A and 5B, the power supply 98 is electrically connected to a magnet/auto demag circuit 102 (node A to node B). The magnet/auto demag circuit 102 controls the electromagnet assembly 34 so that the drill press 18 is selectively connected to the surface of the workpiece W.

Figure 5C:
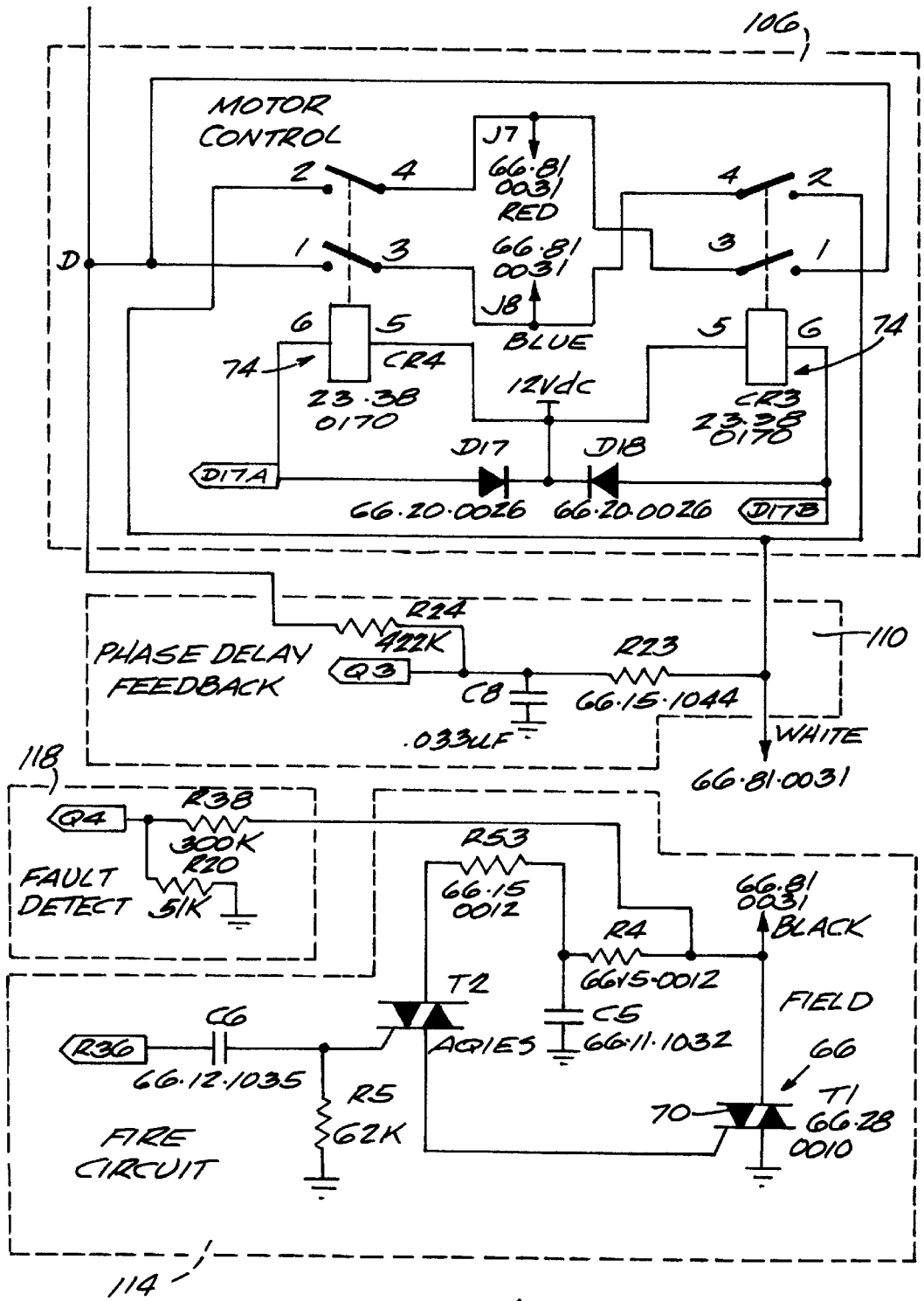

As shown in FIGS. 4A, 5A and 5C, the power supply 98 is also electrically connected to a motor control circuit 106 (partially illustrated) (node C to node D). The motor control circuit 106 controls the operation of the motor 14. The motor control circuit 106 includes the second switch means 74, in the illustrated construction, relays CR3 and CR4. The operation of the motor control circuit 106 and the second switch means is explained below in more detail.

As shown in FIGS. 4A and 5C, the motor control circuit 106 is electrically connected to the phase delay feedback circuit 110. The phase delay feedback circuit 110 monitors the speed of the motor 14 in an attempt to hold the speed of the motor 14 constant. In the illustrated construction, the phase delay feedback circuit 110 does not provide true "classical" speed feedback, i.e., does not directly monitor the speed of the motor 14. Instead, in the phase delay feedback circuit 110, the load point of the motor 14 is sensed via resistor R23, capacitor C8, resistor R24, transistor Q3 (FIG. 6A) and resistor R8 (FIG. 6A). When an increase in the loading of the motor 14 is detected, the conduction angle of the triac 70 is increased to compensate for the additional loading of the motor 14.

As shown in FIGS. 4A and 5C, the phase delay feedback circuit 110 is electrically connected to a fire circuit 114. The fire circuit 114 includes the first switch means 66, in the illustrated construction, triac T1, and is operable to selectively disconnect the motor 14 from the power source 50. The operation of the fire circuit 114 and the first switch means 66 is explained below in more detail.

As shown in FIGS. 4A and 5C, the fire circuit 114 is electrically connected to a fault detector circuit 118. The fault detector circuit 118 generates a signal in both the operating and non-operating state of the motor 14. The fault detection circuit 118 includes the trigger means 90, detects whether a braking condition exists for the drill press 18, and provides the trigger signal to trigger braking of the motor 14. The fault detection circuit 118 is explained in more detail below.

As shown in FIGS. 4B and 6A, the control means 86 includes a microprocessor or microcontroller 122. The control means 86 and the microcontroller 122 are connected to the power supply 98 (connectors R22, see FIGS. 5A and 6A), the magnet/auto demag circuit 102 (see FIG. 6A and FIG. 5A (connectors R37)), the motor control circuit 106 (FIG. 6A), the phase delay feedback circuit 110 (FIG. 6A), the fire circuit 114 (connectors R36, see FIGS. 5C and 6A) and the fault detector circuit 118 (FIG. 6A). It should be understood that, in other constructions (not shown), the control means 86 may include different and separate components performing the functions of the microcontroller 122, as described below.

The microcontroller 122 is operable and programmable to control braking of the motor 14. The microcontroller 122 outputs the control signal to at least one of the first switch means 66 and the second switch means 74 to brake the motor 14. Preferably, the microcontroller 122 is electrically connected with the first switch means 66 and with the second switch means 74. Also, to brake the motor 14, the microcontroller 122 is preferably operable to output the first control signal to the first switch means 66, to disconnect the motor 14 from the power source 50, and the second control signal to the second switch means 74, to connect the motor 14 in a closed loop and to generate counter-EMF. The operation of the control means 86 and the microcontroller 122 is explained below in more detail.

The control means 86 and the microcontroller 122 receive a current signal (node E to node F) representing the power cycle of the alternating current supplied by the power source 50. With this current signal, the microcontroller 122 is operable to begin braking operations at the selected brake start point on the power cycle, skip the selected number of power cycles during braking operations and ramp the voltage provided to regulate the braking force applied to the motor 14 and the stopping time of the motor 14, and stop braking operations at the selected brake end point on the power cycle (after a selected number of power cycles).

The control means 86 requires an input frequency of 45–70 Hz and works with stepped and square-wave waveforms that are commonly seen on inverters and alternators, alternate sources of power. The microcontroller 122 senses the frequency and internally self-adjusts by looking at the current signal generated from resistors R22, R7, R21, and transistor Q1. Pin 3 on the microcontroller 122 becomes active only if an inverter is used as power. If DC power is applied to the control means 86, a fault condition will occur. If power to the control means 86 is lost for less than approximately 0.300 seconds, the electromagnet assembly 34 will stay in the state it was in before the power loss, and the motor 14 will turn off, if it was running. If power is lost for greater than approximately 0.300 seconds, the motor 14 and electromagnet assembly 34 will turn off. At no point will the motor 14 ever operate while the electromagnet assembly 34 is not energized.

Figure 6B:
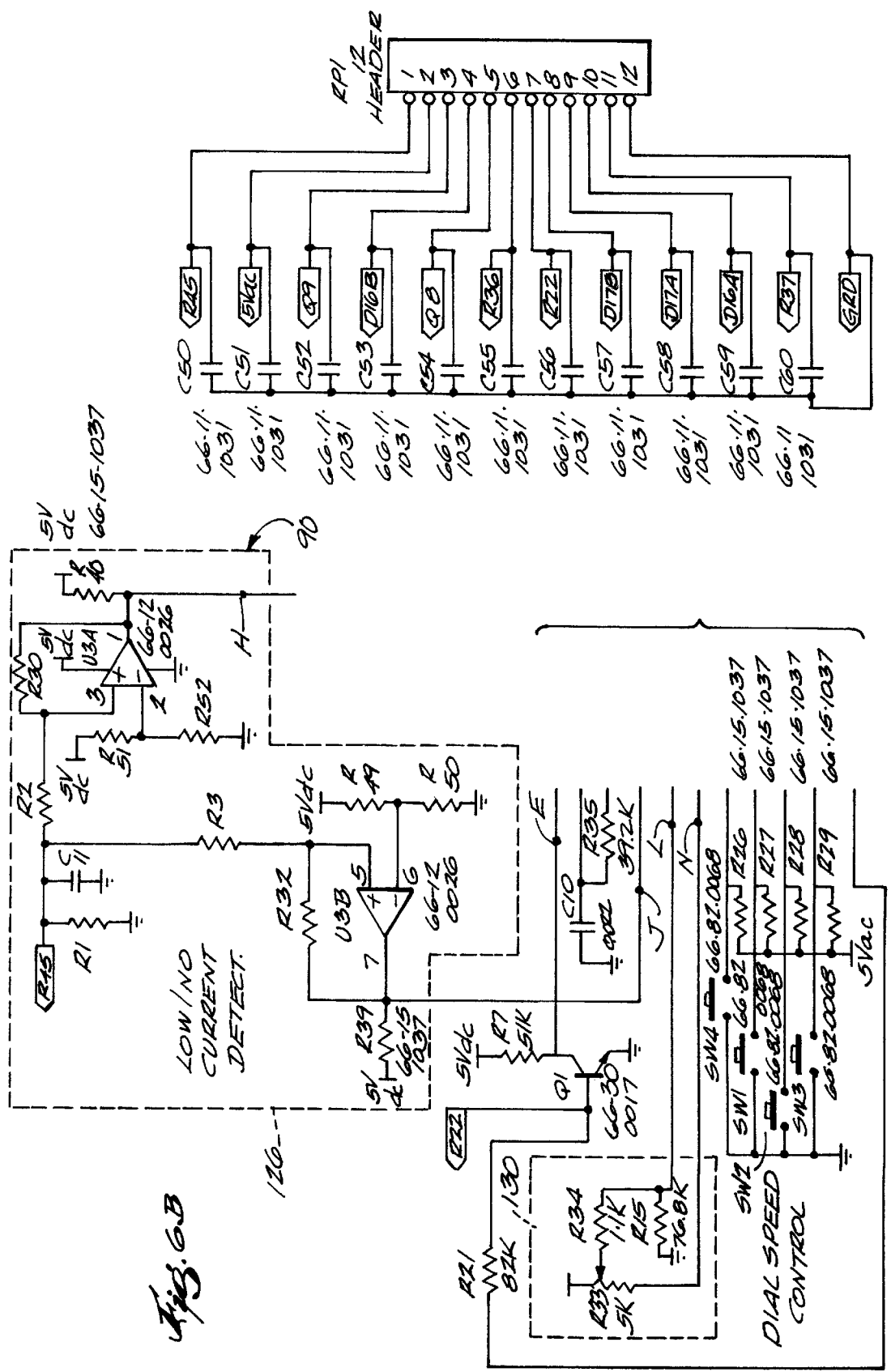

As shown in FIGS. 4B, 6A and 6B, the microcontroller 122 is also connected to a low/no current detector circuit 126 (node G to node H and node I to node J). As shown in FIGS. 5B and 6B, the low/no current detector circuit 126 is also connected to the magnet/auto demag circuit 102 (connectors R45). The low/no current detector circuit 126 includes the trigger means 90 to trigger braking of the motor 14.

As shown in FIGS. 4B, 6A and 6B, the microcontroller 122 is also electrically connected with a dial speed control circuit 130 (node K to node L and node M to node N). The dial speed control circuit 130 operates to control the speed of the motor 14. In the illustrated construction, to control the speed of the motor 14, the dial speed control circuit 130 includes a potentiometer R33 and a divider network including R34 and R15. The resistor divider network develops and supplies a speed control signal to the microcontroller 122. The microcontroller 122 manipulates the supplied speed control signal and then controls the triac firing delay, which, in turn, varies the rotational speed of the motor 14. The speed control resulting from the dial speed control circuit 130 is a digital implementation and is controlled by the microcontroller 122. The digital implementation is selfcalibrating and is thus less susceptible to tolerance stackups in the potentiometer R33 and the resistor divider network.

In operation, the drill press 18 is connected to the AC power source 50. Referring now to the magnet/auto demag circuit 102, when switch SW3 is closed, the red light emitting diode ("LED") illuminates and relay CR2 closes; this powers up the full wave bridge (consisting of diodes D7, D8, D9, and D10). When switch SW3 is closed while the electromagnet assembly 34 is energized and the motor 14 is not operating, the LED turns off, and the microcontroller 122 goes through the following demag sequence:

1. Relay CR2 opens (0.400 seconds).
2. Relay CR1 closes to the demag position.
3. Relay CR2 closes.
4. Triac T3 is fired starting on a negative AC half cycle, then two half cycles are skipped and the triac T3 is then fired again. The triac T3 fires twelve times (0.300 seconds) with decreasing amplitude on each pulse, creating a ringing situation which causes the demag function to operate more efficiently.
5. Relay CR2 opens.
6. Relay CR1 opens to the magnet position.

Referring now to the fire circuit 114, this fire circuit 114 is the firing circuit for the triac T1 which is controlled by the microcontroller 122. Firing pulses from the microcontroller cause the logic triac T2 to conduct, which in turn causes the power triac T1 to control current flow through the motor 14. The speed of the motor 14 increases as the microcontroller 122 delivers more firing pulses to triac T2. Electronic "Pre Burners" are generated by the microcontroller 122 at the maximum dial speed. This provides the maximum motor speed achievable from the triac control circuitry.

The motor control circuit 106 also includes a soft-start feature to increase the life of the motor 14 and to decrease stress on the overall system by ramping the motor 14 to full-on. This soft-start feature ramps the motor speed from zero to full-on over a time period of 0.400 seconds and is facilitated by the microcontroller 122. The direction of rotation of the armature (and the associated spindle assembly 38 and drill bit 42) is switched from forward to reverse with relays CR3 and CR4. When switch SW4 is closed, the microcontroller 122 closes relay CR4, controls the triac, and soft-starts the motor 14 in the forward direction. When switch SW1 is closed the microcontroller 122 closes relay CR3, controls the triac, and soft-starts the motor 14 in the reverse direction. If the motor 14 is already operating in one direction and a change in the direction of armature rotation is requested, a delay of 0.320 seconds is implemented to allow the motor speed to decrease before changing the direction of rotation of the armature.

The fault detection circuit consists of transistor Q9 and resistors R16, R38 and R20 and generates a signal to the microcontroller 122 in both the running and non-running state of the motor. Before powering the motor 14, the microcontroller 122 verifies the integrity of relays CR3 and CR4 (welded contacts or non-functional contacts). This integrity check assures proper operation of the motor braking and control feature in the system. If, when the motor 14 is in a non-operating state, a signal is present at input P20 of the microcontroller 122, the microcontroller 122 will assume a fault condition due to shorted relay contacts of either relays CR3 or CR4. If, when the motor 14 is in an operating state, a signal is present at input P20 of the microcontroller 122, the microcontroller 122 will assume a fault condition due to open relay contacts of either relays CR3 or CR4, or a shorted triac condition. The fault detection circuit 118 also recognizes proper connection of the motor 14 to the control panel.

Referring to the low/no current detection circuit 126, the electromagnetic holding force of the electromagnet assembly 34 decreases as the current through the magnet coil decreases. The minimum voltage required to adequately secure the drill press 18 to a properly sized workpiece W during drilling operations is 90 V AC. If the power source 50 does not reach at least 90 V AC within five seconds of application, operation of the motor 14 will be disabled and the control panel will signal a fault condition. The five second window accounts for the time required for alternate sources of power to switch from an idle condition to a stabilized power source. If, while the control panel is operational, the input voltage drops below approximately 90 V AC, the motor 14 will not operate, and the panel will signal a fault condition until proper voltage levels are re-established. If the motor 14 is operating and the input voltage level drops below 90 V AC, motor operation will cease and the panel will signal a fault condition. The fault condition will exist until proper voltage levels are re-established. The electromagnet assembly 34 will continue to operate during this condition unless the user presses the magnet on/off button. If current through the electromagnet assembly 34 is interrupted (i.e., broken magnet wire) while the motor 14 is operating, the control panel will trigger braking of the motor 14 and assume a fault condition, as explained below in more detail.

In the illustrated construction, resistor R45 senses the current flowing through the electromagnet assembly 34. The voltage across the sensing resistor R45 is rectified by diode D4 and filtered by capacitor C11. This voltage is then presented to the U3 comparators, which are referenced to different voltage levels derived from the +5 V DC bus. Resistors R49 and R50 establish the reference for the low voltage condition, and resistors R51 and R52 establish the reference for the no voltage condition.

If any of the microswitches SW1–SW4 remain shorted for more than two seconds, the control panel will assume a fault condition. The motor 14 will not operate or will shut off and be braked if it was operating. The electromagnet assembly 34 will remain in its current state if this fault occurs. In order to minimize the effects of vibration, the microcontroller 122 repetitively samples the microswitches SW1–SW4 to confirm an intended actuation.

There are two types of flashes that occur when a system fault is detected, a "blink" and a "flash". The flash is a 50% duty cycle of the LED and a blink is a less than 50% duty cycle of the LED. The following is a list of the conditions that cause system faults:

Flash:
   bad electromagnet assembly 34
   bad motor 14
   bad electromagnet assembly connection
   bad motor connection
   failed or stuck switch Blink:
   low electromagnet assembly current
   DC power applied
   power frequency too high or too low If a system fault occurs, a more detailed explanation of the failure can be seen from the output signal on pin 1 of the microcontroller 122.

To brake the motor 14, in the illustrated construction, when the trigger means 90 outputs the trigger signal to the control means 86, the microcontroller 122 outputs the first signal to the first switch means 66 to open the triac 70

(forcing the triac 70 into a non-conducting state), to disconnect the motor 14 from the power source 50. The microcontroller 122 then outputs the second signal to the second switch means 74 (by closing both relays CR4 and CR3), to connect the motor 14 in a closed loop and to generate counter-EMF. In the construction illustrated in FIG. 2, the switch 78 is closed to allow current through the closed loop. In the construction illustrated in FIG. 3, the triac 82 is closed (forced into a conducting state) to allow current through the closed loop.

As discussed above, the control means 86 begins the braking operation at the selected brake start point in the power cycle of the alternating current from the power source 50. The microcontroller 122 then outputs the first control signal and the second control signal on desired power cycles to pulse the first switch means 66 (the triac 70) and the second switch means 74 (the relay 78 or the triac 82) for the desired number of power cycles and at the desired voltage and phase angle depending on how quickly the motor 14 needs to stop (based on the type of braking condition).

In the preferred embodiment, two AC half-cycles are skipped between successive motor braking cycles. Also, the braking operation is preferably conducted for generally 16 power cycles to the selected braking end point. Further, in the preferred embodiment, the microcontroller 122 controls the braking function so that the voltage supplied to the closed loop is ramped, i.e., the supplied voltage increases on subsequent power cycles to the maximum voltage near the end of the braking operation. In this manner, the braking force applied to the motor 14 and the stopping time of the motor 14 is optimized to provide the necessary braking while minimizing any damage to the motor 14 and its components.

Once braking is completed, the microcontroller 122 stops outputting the first control signal and the second control signal so that the first switch means 66 and the second switch means 74 reset and return to the normal motor operating state. Specifically, the triac 70 is turned off, and the short across the armature is removed (the relay 78 is opened or the triac 82 turned on) before the motor 14 is again connected to the power source 50.

Figure 7:
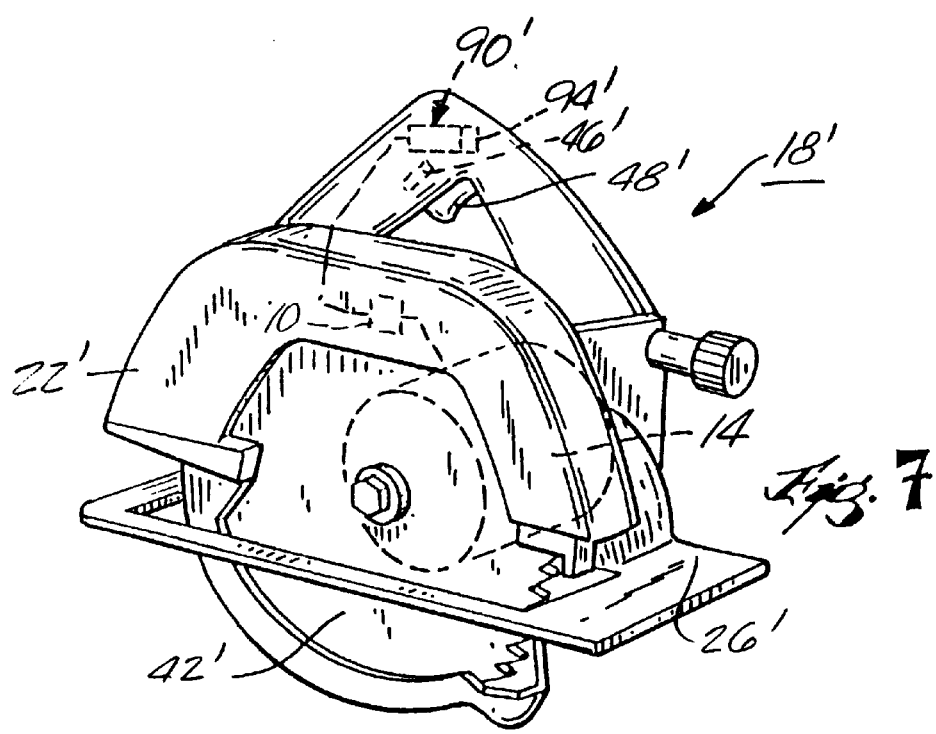
FIG. 7 is a perspective view of an alternative power tool and a braking and control circuit embodying the invention.

In an alternative construction illustrated in FIG. 7, the power tool is a circular saw 18' including the electric motor 14 and the braking and control circuit 10 embodying the invention. In this construction, the circular saw 18' includes a housing 22' supported on a workpiece W by a shoe plate 26'. The electric motor 14 is connected to a spindle assembly 38' to rotatably drive a tool element, such as a saw blade 42', to cut the workpiece W. An on/off switch 46' is operated by a trigger 48' and selectively connects the motor 14 to the power source 50.

The circular saw 18' includes sensing means 92' for sensing a safety-related braking condition. The sensing means 92' is a "kick-back" or "binding" sensing means 94'. Such a binding sensing means 94' senses a change in the position, velocity or acceleration of the power tool, such as the circular saw 18', resulting from the tool element, such as the saw blade 42', binding on the workpiece W. Such binding causes the circular saw to jerk or kick-back. If this occurs, the binding sensing means 94' outputs the trigger signal, a "binding" signal, to trigger braking of the motor 14.

The circular saw 18' also includes trigger means 90' to trigger braking for a productivity-related braking condition. In the illustrated construction, the trigger means 90' includes the on/off switch 46'. When the operator releases the trigger 48', so that the on/off switch 46' disconnects the motor 14 from the power source 50, the trigger signal, an "off" signal, is output to the control means 86' to trigger braking of the motor 14.

Generally, the microcontroller 122 operates as described above to brake the motor 14 in the circular saw 18'. When the trigger means 90', binding sensing means 94' or on/off switch 46', outputs the trigger signal to the control means 86, the control means 86 outputs the first control signal to the first switch means 66 and the second control signal to the second switch means 74 to brake the motor 14.

The microcontroller 122 is programmed to brake the motor 14 more quickly (i.e., the motor 14 is braked in approximately 1 sec.) when the "binding" signal is received—a safety-related braking condition. When the "off" signal is received—a productivity-related braking condition, the motor 14 is braked more slowly (relative to the safety-related braking condition, i.e., the motor 14 is braked in approximately 2 sec.) because this condition occurs more frequently, i.e., each time the operator releases the trigger 48'.

Various features of the invention are set forth in the following claims.

We claim:

1. A braking and control circuit for an electric motor, the motor including a housing, a stator supported by the housing, and a shaft rotatably supported by the housing, wherein the stator is selectively connected with an alternating current power source to rotatably drive the shaft, said braking and control circuit comprising:
    a first switch for selectively disconnecting the motor from the power source;
    a second switch electrically connected across the motor; and
    a control circuit electrically connected with the power source, said control circuit receiving a current signal representing the alternating current and including a microcontroller electrically connected with at least one of said first switch and said second switch, said microcontroller being operable to output a control signal to control said at least one of said first switch and said second switch to brake the motor, said microcontroller being programmable to optimize braking of the motor and to select a braking start point corresponding to a start point phase angle of the alternating current, and said microcontroller outputting the control signal when the alternating current is in the start point phase angle.

2. The braking and control circuit as set forth in claim 1 wherein the alternating current has a plurality of cycles, and wherein said microcontroller is programmable to select a braking end point corresponding to an end point phase angle of the alternating current, the end point phase angle being a selected number of cycles after the start point phase angle, said microcontroller ceasing to output the control signal when the alternating current is in the end point phase angle.

3. The braking and control circuit as set forth in claim 1 wherein the alternating current has a plurality of cycles, and wherein said microcontroller outputs the control signal on selected ones of the plurality of cycles to control said at least one of said first switch and said second switch on the selected ones of the plurality of cycles to brake the motor.

4. A drill press comprising:
    a housing;
    a base connected with said housing and supporting said drill press on a workpiece, said base being selectively connected with the workpiece;
    an electric motor supported by said housing and operable to drive a tool element, said motor including a stator supported by said housing, and a shaft rotatably supported by said housing, said motor being connectable with a power source;

a spindle connected with said shaft for rotation with said shaft, said spindle supporting a tool bit engageable with the workpiece;

braking and control means for controlling and braking said motor, said braking and control means including switch means electrically connected with said motor, and control means electrically connected with said switch means and operable to output a control signal to control said switch means to brake the motor; and breakaway sensing means electrically connected with said control means and operable to output a breakaway signal to said control means if said base brakes away from the workpiece so that said control means outputs the control signal to said switch means to brake said motor.

5. A power tool comprising:

a housing;

an electric motor supported by said housing and operable to drive a tool element, said motor including a stator supported by said housing, and a shaft rotatably supported by said housing, said motor being connectable with a power source;

a spindle connected with said shaft for rotation with said shaft, said spindle supporting a tool element engageable with a workpiece;

braking and control means for controlling and braking said motor, said braking and control means including switch means electrically connected with said motor, and control means electrically connected with said switch means and operable to output a control signal to control said switch means to brake the motor; and binding sensing means electrically connected with said control means and operable to output a binding signal to said control means if the tool element binds on the workpiece so that said control means outputs the control signal to said switch means to brake said motor.

6. In a power tool, a method for braking and controlling an electric motor, the motor including a housing, a stator supported by the housing, and a shaft rotatably supported by the housing, the motor being selectively connected with an alternating current power source to rotatably drive the shaft, said method comprising:

(a) providing a braking and control circuit including a first switch for selectively connecting the motor to the power source, a second switch electrically connected in parallel with the motor, and a control circuit including a microcontroller electrically connected with at least one of the first switch and the second switch;

(b) outputting a control signal from the microcontroller to control at least one of the first switch and the second switch to brake the motor said outputting act including outputting the control signal when the alternating current is in a start point phase angle;

(c) programming the microcontroller to optimize braking of the motor, said programming act including programming the microcontroller to select the braking start point corresponding to a start point phase angle of the alternating current; and (d) providing to the control circuit a current signal representing the alternating current.

7. The method as set forth in claim 6 wherein (c) includes programming the microcontroller to select a braking end point corresponding to an end point phase angle of the alternating current, the end point phase angle being a selected number of cycles after the start point phase angle, and wherein said method further comprises:

(e) ceasing to output the control signal when the alternating current is in the end point phase angle.

8. The method as set forth in claim 6 wherein the alternating current has a plurality of cycles, and wherein (b) includes outputting the control signal on selected ones of the plurality of cycles to control the at least one of the first switch and the second switch on the selected ones of the plurality of cycles to brake the motor.

9. A software program for controlling the braking of a motor in a power tool, said software program controlling the motor by:

receiving a signal representing an alternating current supplied to the motor from a power source;

receiving a trigger signal to trigger braking of the motor;

evaluating the alternating current signal to determine a phase angle of the alternating current; and outputting a control signal to control a switch to brake the motor when the current signal represents a selected brake start point phase angle.

10. The software program as set forth in claim 9 wherein said outputting act includes outputting a first control signal to a first switch to brake the motor, and outputting a second control signal to a second switch to brake the motor.

11. A braking and control circuit for an electric motor, the motor including a housing, a stator supported by the housing, and a shaft rotatably supported by the housing, wherein the stator is selectively connected with a power source to rotatably drive the shaft, said braking and control circuit comprising:

a first switch for selectively disconnecting the motor from the power source;

a second switch electrically connected across the motor; and a control circuit electrically connected with said first switch and said second switch and operable to output a first control signal to said first switch and a second control signal to said second switch to brake the motor;

wherein said control circuit includes a microcontroller electrically connected with said first switch and said second switch, said microcontroller being operable to output the first control signal and the second control signal, wherein said microcontroller is programmable to optimize braking of the motor;

wherein the motor is braked in a stopping time, and wherein said microcontroller is programmable to change the stopping time of the motor.

12. A braking and control circuit for an electric motor, the motor including a housing, a stator supported by the housing, and a shaft rotatably supported by the housing, wherein the stator is selectively connected with a power source to rotatably drive the shaft, said braking and control circuit comprising:

a first switch for selectively disconnecting the motor from the power source;

a second switch electrically connected across the motor; and a control circuit electrically connected with said first switch and said second switch and operable to output a first control signal to said first switch and a second control signal to said second switch to brake the motor;

wherein said control circuit includes a microcontroller electrically connected with said first switch and said second switch, said microcontroller being operable to output the first control signal and the second control signal, wherein said microcontroller is programmable to optimize braking of the motor;

wherein the motor is braked with a braking force, and wherein said microcontroller is programmable to change the braking force applied to the motor.

13. A braking and control circuit for an electric motor, the motor including a housing, a stator supported by the housing, and a shaft rotatably supported by the housing, wherein the stator is selectively connected with a power source to rotatably drive the shaft, said braking and control circuit comprising:

a first switch for selectively disconnecting the motor from the power source;

a second switch electrically connected across the motor; and a control circuit electrically connected with said first switch and said second switch and operable to output a first control signal to said first switch and a second control signal to said second switch to brake the motor;

wherein said control circuit includes a microcontroller electrically connected with said first switch and said second switch, said microcontroller being operable to output the first control signal and the second control signal, wherein said microcontroller is programmable to optimize braking of the motor;

wherein the power source is an alternating current power source, wherein said control circuit receives a current signal representing a voltage of the alternating current, and wherein said microcontroller is programmable to output at least one of the first control signal and the second control signal at a point in the alternating current so that a desired voltage is supplied to brake the motor.

14. The braking and control circuit as set forth in claim 13 wherein the alternating current has a first cycle and a second cycle, and wherein said microcontroller is programmable to output at least one of the control signals at a point in the first cycle so that a first voltage is supplied to brake the motor and to output at least one of the control signals at a point in the second cycle so that a second voltage is supplied to brake the motor.

15. The braking and control circuit as set forth in claim 14 wherein the second voltage is greater than the first voltage.

16. In a power tool, a method for braking and controlling an electric motor, the motor including a housing, a stator supported by the housing, and a shaft rotatably supported by the housing, the motor being selectively connected with a power source to rotatably drive the shaft, said method comprising:

(a) providing a braking and control circuit including a first switch for selectively connecting the motor to the power source, a second switch electrically connected in parallel with the motor, and a control circuit electrically connected with the first switch and the second switch; and (b) outputting a first control signal from the control circuit to control the first switch and a second control signal from the control circuit to control the second switch to brake the motor; and wherein the control circuit includes a microcontroller electrically connected with the first switch and the second switch, wherein (b) includes outputting the first control signal and the second control signal from the microcontroller, wherein said method further comprises:

(c) programming the microcontroller to optimize braking of the motor;

wherein the motor is braked in a stopping time, and wherein (c) includes programming the microcontroller to change the stopping time of the motor.

17. In a power tool, a method for braking and controlling an electric motor, the motor including a housing, a stator supported by the housing, and a shaft rotatably supported by the housing, the motor being selectively connected with a power source to rotatably drive the shaft, said method comprising:

(a) providing a braking and control circuit including a first switch for selectively connecting the motor to the power source, a second switch electrically connected in parallel with the motor, and a control circuit electrically connected with the first switch and the second switch; and (b) outputting a first control signal from the control circuit to control the first switch and a second control signal from the control circuit to control the second switch to brake the motor; and wherein the control circuit includes a microcontroller electrically connected with the first switch and the second switch, wherein (b) includes outputting the first control signal and the second control signal from the microcontroller, wherein said method further comprises:

(c) programming the microcontroller to optimize braking of the motor;

wherein the motor is braked in a stopping time, and wherein (c) includes programming the microcontroller to change the braking force applied to the motor.

18. In a power tool, a method for braking and controlling an electric motor, the motor including a housing, a stator supported by the housing, and a shaft rotatably supported by the housing, the motor being selectively connected with a power source to rotatably drive the shaft, said method comprising:

(a) providing a braking and control circuit including a first switch for selectively connecting the motor to the power source, a second switch electrically connected in parallel with the motor, and a control circuit electrically connected with the first switch and the second switch; and (b) outputting a first control signal from the control circuit to control the first switch and a second control signal from the control circuit to control the second switch to brake the motor;

wherein the control circuit includes a microcontroller electrically connected with the first switch and the second switch, wherein (b) includes outputting the first control signal and the second control signal from the microcontroller, wherein said method further comprises the act of:

(c) programming the microcontroller to optimize braking of the motor;

wherein the power source is an alternating current power source, and wherein said method further comprises the act of:

(d) providing to the control circuit a current signal representing a voltage of the alternating current; and wherein (c) includes programming the microcontroller to output at least one of the first control signal and the second control signal at a point in the alternating current so that a desired voltage is supplied to brake the motor.

19. The method as set forth in claim 18 wherein the alternating current has a first cycle and a second cycle, and wherein act (c) includes programming the microcontroller to output the control signal at a point in the first cycle so that a first voltage is supplied to brake the motor and to output at least one of the control signals at a point in the second cycle so that a second voltage is supplied to brake the motor.

20. The method as set forth in claim 19 wherein the second voltage is greater than the first voltage.

21. A software program for controlling the braking of a motor in a power tool, said software program controlling the motor by:
  (a) receiving a signal;
  (b) outputting a first control signal to control a first switch to brake the motor; and
  (c) outputting a second control signal to a second switch to brake the motor;
  wherein the received signal is a signal representing an alternating current supplied to the motor from a power source, wherein said software program further controls the motor by, before (b):
  (d) receiving a trigger signal to trigger braking of the motor; and
  (e) evaluating the alternating current signal to determine the phase angle of the alternating current;
  wherein (b) includes outputting the control signal when the current signal represents a selected brake start point phase angle.

\* \* \* \* \*